United States Patent [19]

Duffee et al.

[11] 4,443,015

[45] Apr. 17, 1984

[54] CARTRIDGE TYPE ROTARY SHAFT SEAL WITH BEARINGS AND BELLOWS

[75] Inventors: Henry S. Duffee; Meigs C. Golden, Jr., both of Florence, S.C.

[73] Assignee: Five Star Seal Corporation, Florence, S.C.

[21] Appl. No.: 398,182

[22] Filed: Jul. 14, 1982

[51] Int. Cl.³ .................. F16J 15/34; F16J 15/54
[52] U.S. Cl. .................................. 277/30; 277/38; 277/39; 277/65; 277/83
[58] Field of Search .................. 277/30, 83, 58, 59, 277/38, 65, 97

[56] References Cited

U.S. PATENT DOCUMENTS

| | | | |
|---|---|---|---|
| 3,030,118 | 4/1962 | Groce | 277/59 |
| 3,339,929 | 9/1967 | Stam | 277/65 |
| 4,087,097 | 5/1978 | Bossens et al. | 277/83 |
| 4,272,084 | 6/1981 | Martinson | 277/30 |
| 4,294,454 | 10/1981 | Cannings | 277/65 |

*Primary Examiner*—Robert I. Smith
*Attorney, Agent, or Firm*—Harvey B. Jacobson

[57] ABSTRACT

A cartridge type assembly is provided for use in conjunction with a housing wall having an opening thereof through which a rotary shaft projects. The assembly includes an inner bearing race supporting sleeve which is axially removably slidable, sealed relative to and releasably anchored in axial position on the shaft. A floating annular outer bearing race supporting housing is disposed about the sleeve and bearing structure including inner and outer races is stationarily supported from the sleeve and housing, respectively against axial and angular displacement relative thereto. The sleeve includes first rotary axial face seal ring structure removably stationarily supported therefrom in sealed engagement therewith and the housing includes second stationary axial face seal ring structure removably stationarily supported therefrom and with which the first rotary axial face seal ring structure is rotatably slidably engaged. A cylindrical fluid impervious bellows assembly is provided and includes opposite axial end portions removably secured to the housing wall about the opening therein in sealed engagement therewith and to the angular housing in sealed engagement therewith. The entire cartridge-type assembly may be readily quickly removed for servicing and/or replacement.

9 Claims, 3 Drawing Figures

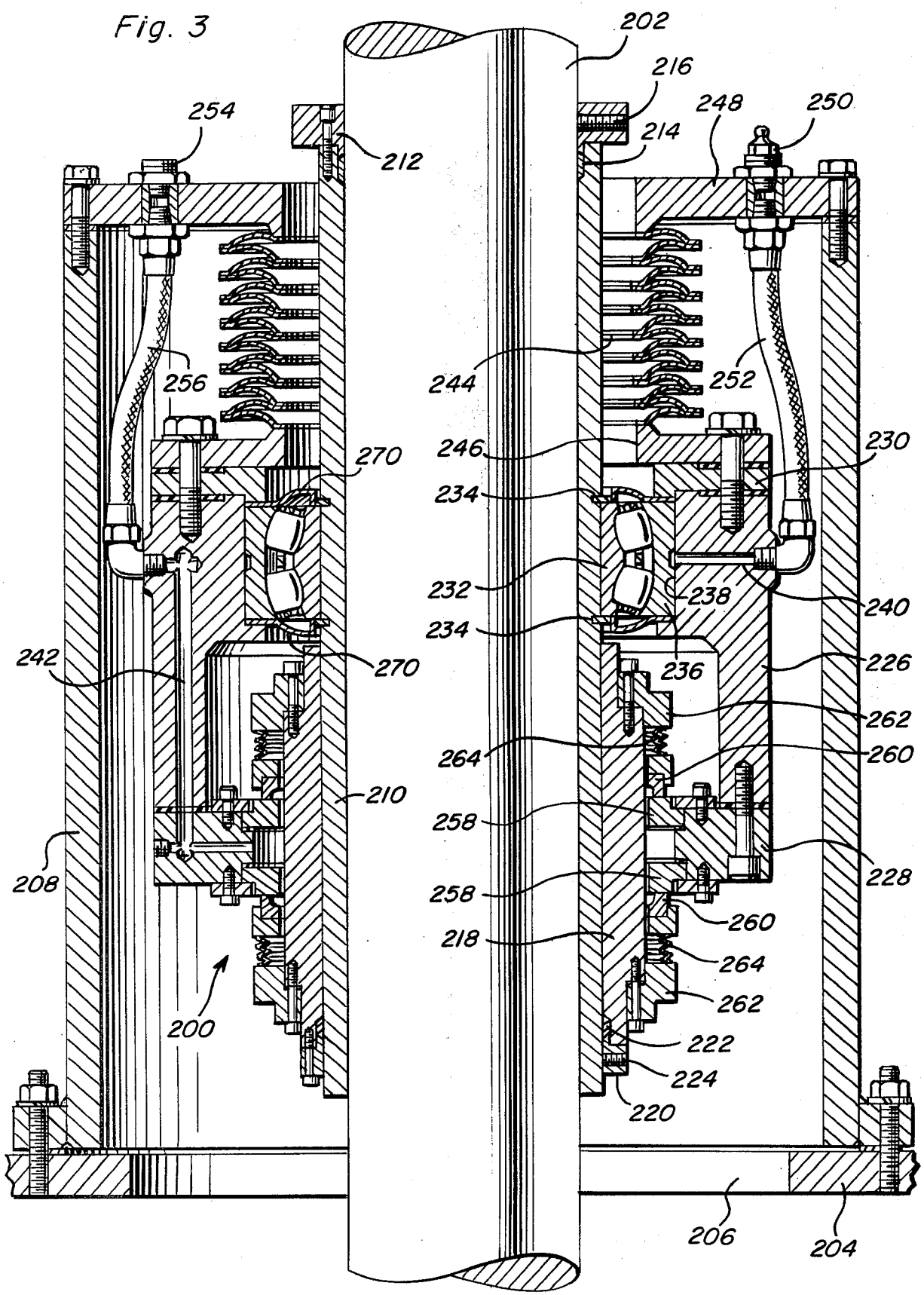

CARTRIDGE TYPE ROTARY SHAFT SEAL WITH BEARINGS AND BELLOWS

BACKGROUND OF THE INVENTION

1. Field of the Invention

This invention relates to mechanical seals, more particularly to rotating mechanical shaft seals.

2. Description of the Prior Art

In mechanical end face seals, sealing is effected by maintaining a pair of sealing faces, both normal to the shaft axis, in full face contact. In order to achieve optimum reliability and face life, the faces must remain in constant alignment, with controlled and predictable face loading to insure proper fluid film thickness between the faces. Exact alignment and loading must be obtained at the time of sealed installation and maintained during all operating conditions. Alignment and loading must be controlled in the event of either imperfect shaft location at installation or shaft displacement relative to the stationary portion of the equipment to be sealed during operation. These displacements are categorized as either axial, radial or angular. A shaft may possibly exhibit only one form of displacement, but typically all three forms exist to some degree in practical application.

Self-contained cartridge type seals, incorporating all critical components in a preassembled unit, are known to the prior art. At installation, true self-contained cartridge type design accomplishes correct spring loading of the faces by virtue of being preassembled, and compensates for static axial and radial shaft displacements since the cartridge sleeve axial position is predetermining, and the centering clip design typical of the art insures that the stationary portion of the seal is centered with respect to the shaft and the rotating sleeve of the cartridge. Cartridge type seal construction has not been heretofore utilized as a part of a design comparable to this invention. The problem of radial shaft deflections in operation is addressed in the existing art by designing the harder mating face of the pair of faces with a greater outside diameter and lesser inside diameter than the soft face. The intent is to achieve proper face contact in the event of radial displacement of the shaft by providing an extended contact area. Additionally, in the existing art, it is known to spring load one or more of the both seal faces, to provide axial and angular mobility, in an attempt to compensate for initial angular misalignment, and for axial and angular shaft displacements in operation. Additionally, it is known to incorporate an anti-friction bearing integrally in a rigidly matted mechanical seal and housing, as an effort to stabilize the rotating shaft against displacements in the seal area. It is a common characteristic of sealed designs of the prior art that in the case of relative axial, radial or angular displacement between the rotating shaft and the stationary portion of the equipment to be sealed, a corresponding displacement takes place between the rotating end and stationary portions of the seal because of their separate and individual rigid attachment to the rotating shaft and stationary equipment respectively.

Such prior art attempts have not been entirely successful at compensating for shaft displacements. In operation, radial displacement produces uneven wear and tends to introduce any abrasive particles present to the sealed interface in the case of wider hard faces. With flexibility mounted, spring loaded faces, face pressures do to the variations in spring compression with axial or angular shaft displacements can have a disadvantageous effect upon the life and performance of the seal due to over compression, under compression and assymetric compression of the faces. Additionally, successive spring compression due to axial shaft displacement can lead to localized over stress and distortion of the mating faces, especially in the case where the spring load effect is completely negated by bottoming the spring. With a design incorporating a bearing unit with the seal, some shaft stabilization may be achieved, but this is typically only in the radial mode, and often the bearing transmits excessive loads to the sealed cavity, resulting in possible deformation of the stationary seal components. This invention respresents an advance to the state-of-the-art because it overcomes the above noted undesirable conditions by providing a seal which requires no critical measurements at installation, is self-centering and self-aligning, and which maintains optimum face alignment and loading, without face distortion, in the event of static or dynamic shaft displacement in any plane.

Examples of previously known forms of seal and bearing structures including some of the general structural and operational features of the instant invention are disclosed in U.S. Pat. Nos. 2,470,419, 2,513,079, 3,019,779, 3,186,721, 3,612,390, 3,963,247, 4,093,324 and 4,272,084.

SUMMARY OF THE INVENTION

In a typical embodiment, the seal assembly is configured on a shaft sleeve which is rigidly attached to the rotating shaft. The rotating portion of the cartridge seal may be carried on a secondary sleeve which is rigidly held and concentric to the shaft sleeve, or the shaft sleeve may also serve as the seal sleeve. The shaft sleeve is the mounting point for the inner race of the bearing(s). The housing will typically include porting for bearing lubrication and the various environmental controls of the seal. The assembly of the sleeve, seal, bearing(s) and housing is attached to the stationary equipment to be sealed by a concentric flexible lake tight bellows. The bellows attachment to the seal assembly is to either the housing or the sealed gland, according to the particular embodiment. The bellows assembly will be acted upon by torque which is produced by seal face drag and bearing friction. In some embodiments, auxiliary members are introduced to absorb the torsional load imposed on the bellows assembly, while allowing all other deflection of the bellows to occur.

In all embodiments of the invention, the positions of the rotary and stationary portions of the seal are in a fixed relationship independent of shaft movements, inasmuch as the precision bearing(s) forces the housing and the sealed gland to exactly trace the motion of the shaft, sleeve and seal rotary component.

Other features and advantages of the invention will become subsequently apparent upon consideration of the details of construction and operation of the invention as more fully hereinafter described and claimed, reference being had to the accompanying drawings forming a part hereof, where in like numerals refer to like parts throughout. It should be noted that those skilled in the art may conceive variations of the basic rotary end face mechanical sealed designed illustrated in the accompanying drawings. Applications of other known forms of the art do not fall outside the scope and intent of this invention. The same would apply additionally to the state of the art in the bellows and/or bearing technology.

BRIEF DESCRIPTION OF THE DRAWINGS

FIG. 3 is a longitudinal sectional view of a third form of cartridge type seal and bearing assembly constructed in accordance with the present invention and incorporating a welded accordion bellows between the shaft mounted component of the assembly and the associated stationary equipment wall portion.

DETAILED DESCRIPTION OF THE INVENTION

Figure 1:
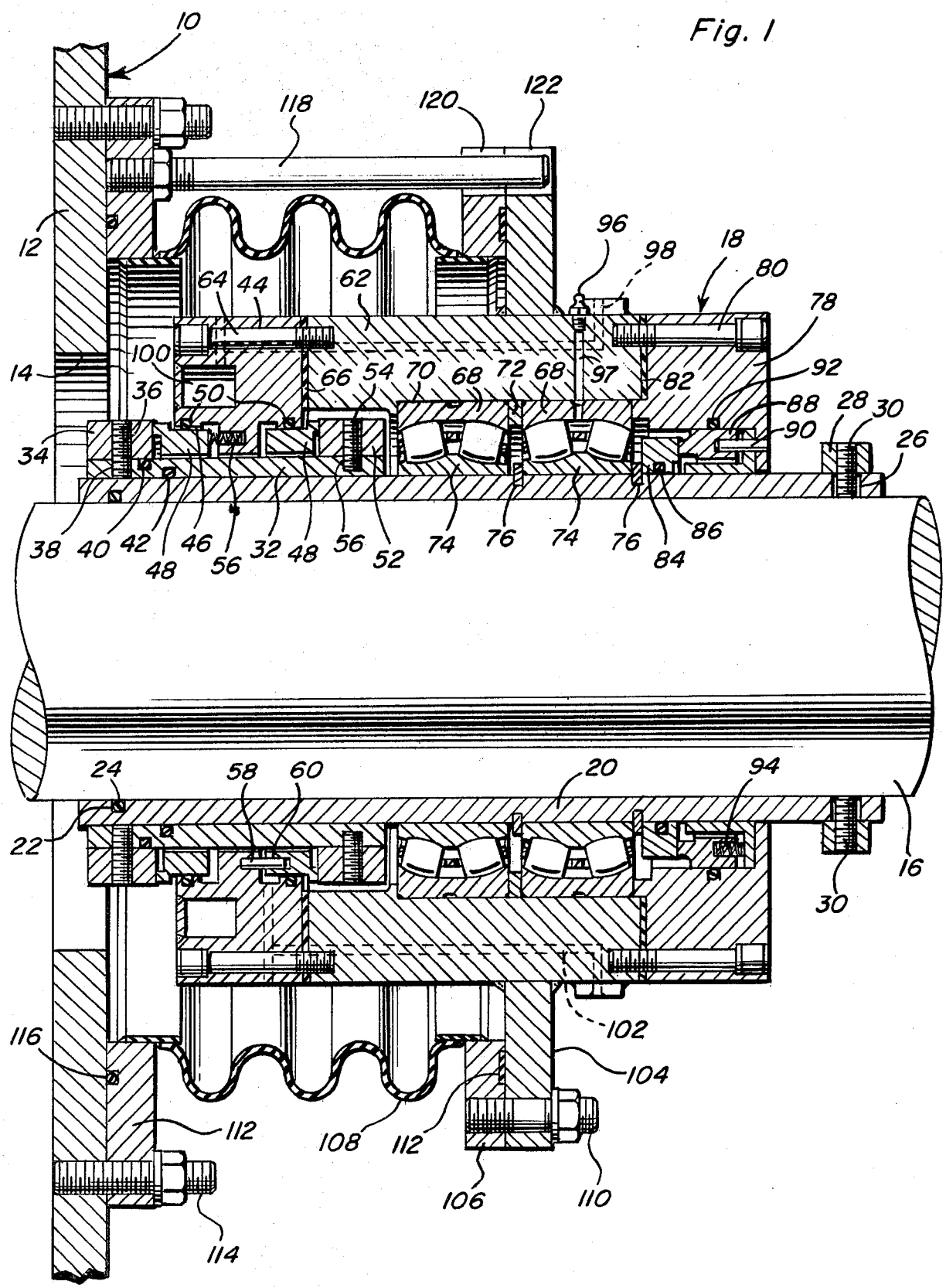
FIG. 1 is a longitudinal sectional view of a cartridge type seal and bearing assembly constructed in accordance wwith the present invention and illustrated in operative association with a stationary equipment wall portion and an associated rotary shaft.

Referring now more specifically to FIG. 1 of the drawings, the numeral 10 generally designates a piece of the equipment including a stationary wall portion 12 having an opening 14 formed therein through which a rotary shaft 16 projects. The first form of cartridge type seal and bearing assembly of the instant invention is referred to in general by the reference numeral 18 and includes a mounting sleeve 20 which is tightly fitted on the shaft 16 and removable axially therefrom. The inner end of the sleeve 10 includes a circumferential groove 22 formed on the inner surface thereof and in which an O-ring seal 24 is received forming a fluid tight seal between the shaft 16 and sleeve 20. The outer end of the sleeve 20 includes radial bores 26 spaced thereabout and a locking collar 28 is carried by the outer sleeve end and includes radial set screws 30 whose inner ends project inwardly through the bores 26 and are tightly engaged with the shaft 16 in order to tightly removably fix the sleeve 20 in axial position on the shaft 16 and for rotation therewith.

A support sleeve 32 is snugly mounted on the inner end of the sleeve 20 and may be axially removed therefrom, but is fixed in axial position thereon and for rotation therewith by a rotary seal face ring 34 snugly telescoped over the inner end of the sleeve 32 and fixed in axial position thereon by set screws 36 spaced circumferentially thereabout, threadedly engaged therewith and passing through circumferentially spaced radial bores formed in the inner end of the sleeve 32, the inner ends of the set screws 36 being tightly engaged with the opposing outer surfaces of the sleeve 32. The rotary seal face ring 34 is sealed relative to sleeve 32 by an O-ring 40 carried by the sleeve 32 and the sleeve 32 is sealed relative to the sleeve 20 by a second O-ring 42 carried by the sleeve 32. An angular gland 44 loosely encircles the sleeve 32 outward of the seal face ring 34 and the gland 44 includes opposite end counter bores 46 in which stationary rotary seal face rings 48 are received, the counter bores 46 including O-ring seals 50 forming fluid tight seals with the stationary rings 48.

The outer end of the sleeve 32 includes a rotary seal face ring 52 corresponding to the seal face ring 34 and mounted on the outer end of the sleeve 32 by set screws 54 carried thereby which are seated in outwardly opening blind radial bores 56 spaced circumferentially about the inner end of the sleeve 32. The stationary seal face rings 48 are biased in opposite axial directions away from each other by compression springs peripherally spaced about the gland 44, carried by the latter and engaging the adjacent axial ends of the rings 48. In additional, each of the rings 48 is keyed to the gland 44 by a plurality of gland supported pins 58 spaced peripherally about the gland 44 and telescopingly received circumferentially spaced bores 60 formed in the rings 48 and opening outwardly above the axially adjacent ends thereof. The axially adjacent ends of the rings 34 and 52 thus rotatably engage the axially remote ends of the rings 48.

The gland 44 is carried by a floating annular housing 62 to which the gland 44 is secured by circumferentially spaced bolts 64 and a flat gasket 66 forms a fluid tight seal between the gland 44 and the housing 62.

The housing 62 receives the outer races 68 of the pair of bearing assemblies within an outer end counter boar 70 formed in the housing 62 and a spacer ring 72 is provided between the axially adjacent ends of the outer races 68. The bearing assemblies include inner races 74 which are tightly fitted over the sleeve 20 and the inner race 74 of the outer bearing assembly is removably fixed in axial position on the sleeve 20 by snap rings 76.

An end cap 74 is secured over the outer end of the housing 62 through the utilization of peripherally spaced bolts 80 and a seal is formed between the end cap 78 and the housing 62 by a flat gasket 82.

A rotary seal face ring 84 is mounted on the sleeve 20 immediately outwardly of the outer most snap ring 76 and includes an O-ring seal 86 which not only serves to form a fluid tight seal between the ring 84 and the sleeve 20, but also to frictionally drive the sleeve 84 from the sleeve 24. A stationary seal face ring 88 is supported with the end cap 78 and keyed thereto by means of peripherally spaced axially extending pins 90 corresponding to the pins 58 and the ring 88 is sealed relative to the end cap 78 by an O-ring 92 carried by the end cap 78, the ring 88 also being yieldingly biased in an axial direction toward the ring 84 by compression springs 94 carried by the ring 88 and spaced peripherally thereabout, the compressional springs 94 corresponding to the compression springs 56.

Suitable lubricant may be provided to the bearing assemblies through a fitting 96 and lubricant bore 98 formed in the housing 62 and the latter includes a pair of coolant liquid inlet and outlet passages 98 through which coolant liquid may be passed to cool the gland 44, the passages 98 opening into and outwardly from an angular compartment 100 formed in the gland 44. In addition, a pair of inlet and outlet passages 102 are provided in the housing 162 by which a buffer liquid may be circulated through the area about the inner face contact areas between the rings 48 and the rings 34 and 52.

The housing 62 includes an outer end angular flange 104 to which a first end member 106 of a flexible corrugated bellows assembly 108 is secured through the utilization of suitable studs 110 and an angular gasket 112 is utilized to assure a fluid tight seal between the end member 106 and the flange 104. The bellows assembly 108 includes a second end member 112 which is secured to the wall 12 about the opening 14 through the utilization of suitable studs 114 and an O-ring 116 is utilized to assure a fluid tight seal between the end member 112 and the wall 12. In addition, the end member 112 includes an axially projecting stud 118 which is received in corresponding registered slots 120 and 122 formed in the end member 106 and the angular flange 104. Thus, the end member 106 and flange 104 are keyed to the wall 12 against rotation and the housing 62 supported from the flange 104 provides a non-rotable base for all stationary components of the seal and bearing assembly 18.

Thus, it may be noted that the housing 62 need not be precisely axially positioned along the shaft 16 relative to the wall 12. In addition, the housing 62 may be slightly angularly and radially displaced relative to the center of the opening 14 according to the precise angular and radial displacement of the shaft 16 relative to the center of the opening 14. In addition, the inner faces between the various stationary seal face rings 48 and 88 and the rotary seal face rings 34, 52 and 84 is maintained substantially constant with the various rotary and stationary seal face rings maintained in substantially constant relative angular and radial positions. Of course, the springs 56 and 94 maintain constant axial pressure on the inner face surfaces of corresponding stationary and rotary seal rings.

Figure 2:
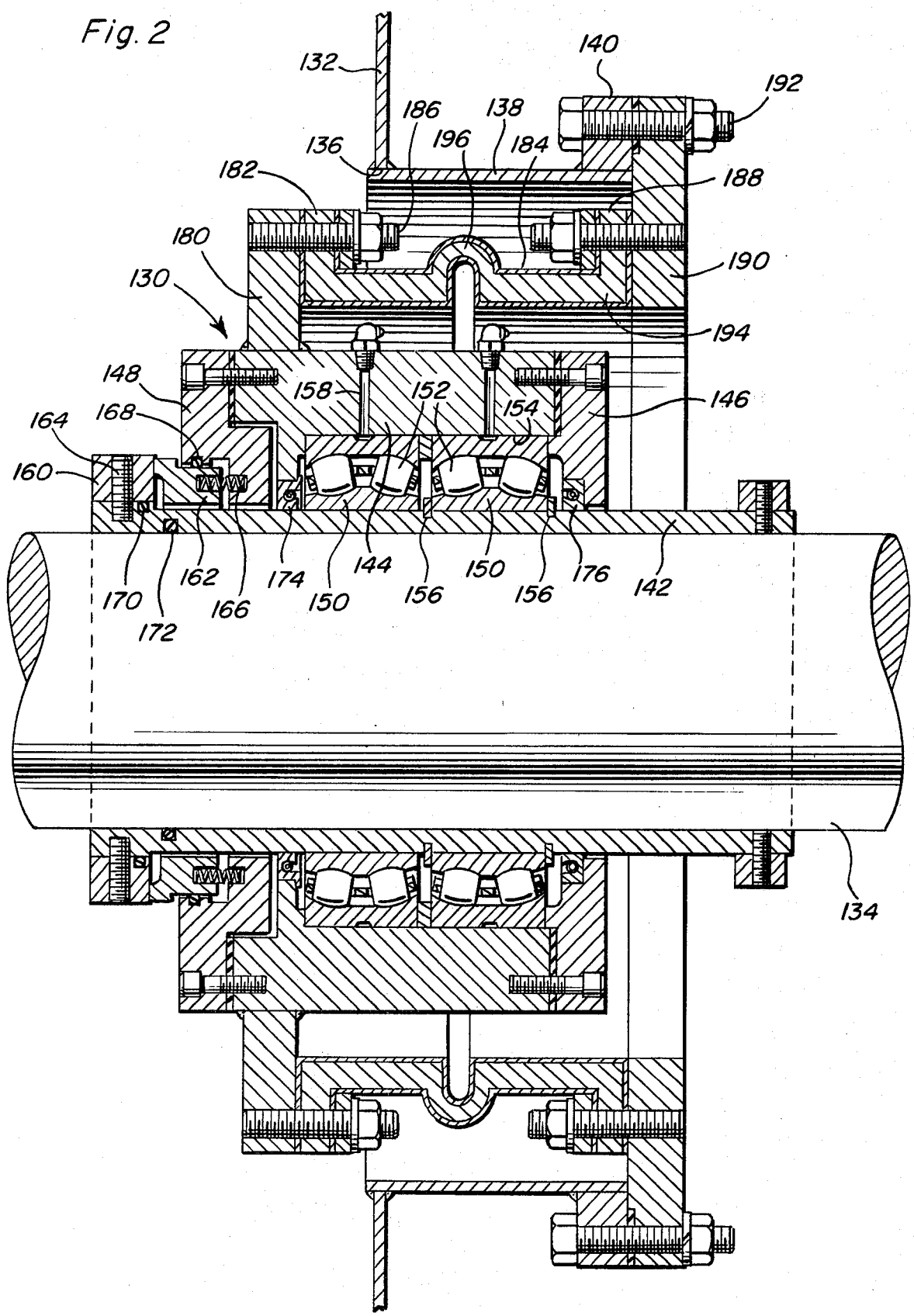
FIG. 2 is a longitudinal sectional view of a second form of cartridge type seal and bearing assembly of the instant invention. Also illustrated in operative association with a stationary equipment wall portion and an associated rotary shaft.

With attention now directed more specifically to FIG. 2 of the drawings, a second form of cartridge-type seal and bearing assembly is referred to in general by the reference numeral 130. The assembly 130 is illustrated in use in conjunction with a stationary housing wall 132 and a rotary shaft 134 generally centered in and extending through an opening 136 formed in the wall 132 and having the inner end of a support sleeve 138 mounted therein, the outer end of the sleeve 138 including a peripheral mounting ring 140 supported therefrom.

The assembly 130 includes a mounting sleeve 142 corresponding to the sleeve 20 sealed relative to and releasably secured in axial position on the shaft 134 a floating housing 144 corresponding to the housing 62, and end cap 146 corresponding to the end cap 78 and a gland 148 corresponding to the gland 44.

Bearing assemblied including inner and outer races 150 and 152 are seated in a counter bore 154 formed in the housing 144 and the outermost bearing assembly is held in axial position on the sleeve 142 by snap rings 156. In addition, the housing 144 includes lubricant passages 158 formed therein through which lubricant may be introduced into the bearing assembly area.

The embodiment of FIG. 2 differs from that of FIG. 1 in that only a single pair of rotary and stationary seal face rings 160 and 162, respectively, are utilized. The ring 160 is keyed to the sleeve 142 by set screws 164 and the ring 162 is keyed relative to the gland 148 by pins (not shown) corresponding to pins 158 and is yieldingly biased into engagement with the ring 160 by springs 166. The gland 148 includes an O-ring 168 establishing a fluid tight seal between the gland 148 and the ring 162 and a similar O-ring 170 is carried by the sleeve 142 and establishes a fluid tight sleeve between the sleeve 142 and the ring 160, a seal ring 172 being carried by the sleeve 142 for forming a fluid tight seal between the seal 142 and the shaft 134. In addition, a pair of angular lip seals 174 and 176 form the seals between the housing 144 and end cap 146 and the sleeve 142 at remote axial ends of the bearing assemblies. In this manner, the lubricant supplied to the bearing assemblies may be contained.

The housing 144 includes a flange 180 corresponding to the flange 104 and to which a first end member 182 of a bellows assembly 184 is secured by studs 186. The bellows assembly 184 includes a second end member 188 which is similarly secured to a flange 190 secured to the mounting ring 140 by bolts 192. The bellows assembly 184 includes a pair of relatively stiff but somewhat flexible opposite end cylindrical portions 194 and a somewhat less stiff and more flexible corrugated and intermediate portion 196 which joins the end portions 194 of the bellows assembly 184. Accordingly, it will be noted that operation of the assembly 130 is very much similar to the operation of the assembly 18, in that the assembly 130 may be compensate for both radial and angular displacement as well as axial displacement of the shaft 134 relative to the housing wall 132. In addition, it may be readily appreciated that the entire assembly 130 may be readily removed as a unit for repair and/or replacement.

With attention now invited more specifically to FIG. 3 of the drawings, a third form of cartridge-type seal and bearing assembly is referred to in general by the reference numeral 200. The assembly 200 is used in conjunction with a vertical shaft 202, a horizontal housing wall 204 having a vertical opening 206 formed therein and a cylindrical mounting extension 208. The assembly 200 is specifically designed for a vertical shaft installation and is intended for higher temperature and pressure situations than those which may be handled by the embodiments illustrated in FIGS. 1 and 2.

The assembly 200 utilizes a sleeve 210 corresponding to the sleeve 20, but which is sealed relative to the shaft 202 by a compression sleeve 212 and a metallic packing 214, the sleeve 212 being removedly fixed in position on the shaft 200 by set screws 216. In addition, a sleeve 218 corresponding to the sleeve 32 is mounted on the sleeve 210 by a compression sleeve 220 and metallic packing 222, the compression sleeve 220 being removably fixed in position on the sleeve 210 by circumferentially spaced radial set screws 224.

The assembly utilizes a floating housing 226 which is similar to the housing 62 and supports a gland 228 therefrom corresponding to the gland 46 and also an end cap 230 corresponding to the end cap 78. However, the assembly 200 includes only a single bearing assembly including an inner race 232, mounted on the sleeve 210 and fixed in axial position thereon by snap rings 234, and an outer race 236 held in position with a counter boar 238 formed in the floating housing 226 by the end cap 230. The housing 226 includes lubricant passages 240 and coolant and buffer liquid passages 242 for the gland 228.

A welded accordion-type bellows assembly 244 is provided and includes a first end member 246 secured to the end cap 230 and a second end member 248 secured to the upper of the end extension 208. Lubricant fittings 250 and lines 252 enable the introduction of lubricant to the passages 240 and fittings 254 and lines 256 enable the introduction of coolant and buffer liquid to the glands 28.

The housing 226 mounts a pair of stationary seal face rings 258 which are engaged by rotary seal face rings 260 mounted on the sleeve 218 by mounting rings 262 mounted thereon and a single spring-type bellows 264 yieldingly biases the rings 260 into the engagement with the rings 258. In addition, pins (not shown) corresponding to the pins 58 key the rings 260 to the mounting rings 262.

As with those embodiments illustrated in FIGS. 1 and 2 of the drawings of the assembly 200 is capable of compensating for not only angular and radial misalignment of the shaft 202 relative to the center axis of the opening 206 but also axial displacement of the shaft 202 relative to the housing wall 204.

Each of the assemblies 18, 130 and 200 may be readily removed for repair or replacement and is self-contained as a unit including both the necessary bearings and the seals. All misalignment and positioning of the assemblies relative to the stationary housing structures is compensated for by the corresponding bellows assemblies 108, 184 and 244. However, the bearing assembly of the embodiment illustrated in FIG. 3 includes metal shields 270 for containing the lubricant supplied thereto, whereas the embodiment illustrated in FIG. 1 merely provides sufficient lubricant receiving space to deter the lubricant from engaging the interface between the rotary and stationary seal rings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a housing wall having an opening therein through which a rotary shaft projects, a cartridge-type seal assembly, said seal assembly including one-piece inner bearing race supporting sleeve means axially removably sldable on, sealed relative to and releasably anchored in axial position on said shaft, a floating annular outer bearing race supporting housing disposed about said sleeve means, bearing means including inner and outer races removably stationarily supported from said sleeve means and housing, respectively, against axial and angular displacement relative thereto, said sleeve means including first rotary aixal face seal ring means removably stationarily supported therefrom in sealed engagement therewith and said housing including second stationary axial face seal ring means removably stationarily supported therefrom and with which said first rotary axial face seal ring means is rotatably slidably engaged, a cylindrical fluid imperious bellows assembly including opposite axial end annular end portions, first means removably securing one of said end portions to said wall in sealed engagement therewith about said opening and second means removably securing the other end portion to said annular housing in sealed engagement therewith.

2. The sealed assembly of claim 1 including means, independent of said bellows assembly, anchoring said housing to said wall against rotation with said sleeve means relative to said wall and including means permitting at least minimal axial displacement of said housing along the axis of rotation of said shaft relative to said wall.

3. The seal of assembly of claim 1 wherein said bellows assembly includes means operative to support said housing from said wall against rotation with said sleeve means about the axis of rotation of said shaft relative to said wall.

4. The seal assembly of claim 1 wherein said bellows assembly includes a welded metal accordion pleated bellows body extending between said end portions and comprises the sole means for preventing relative rotation between said end portions.

5. The seal assembly of claim 1 wherein said bellows assembly includes a radially thick body extending axially between said end portions, said body including generally cylindrical end sections joined by a corrugated center section.

6. The seal assembly of claim 1 including two axially spaced pairs of first and second rotary axial face seal ring means carried by said sleeve means and housing, said housing including a gland body stationary therewith and disposed about said sleeve means intermediate said pairs of ring means and with which the stationary seal ring means are sealingly engaged for axial displacement relative thereto.

7. The seal assembly of claim 6 wherein said gland body includes means for introducing a buffer and gland cooling fluid into the area surrounding said sleeve means intermediate said first rotary axial face seal ring means.

8. The seal assembly of claim 7 wherein said two pairs of first and second ring means are spaced axially of one axial end of said bearing means.

9. The seal assembly of claim 8 wherein said assembly includes a third pair of first and second seal ring means spaced axially of the other axial end of said bearing means.

* * * * *